Patented Sept. 14, 1943

2,329,571

UNITED STATES PATENT OFFICE 2,329,571

FABRICATION OF CRYSTALLINE POLYMERS

Ralph M. Wiley, Midland, Mich., assignor to The Dow Chemical Compay, Midland, Mich., a corporation of Michigan No Drawing. Application October 11, 1941,
Serial No. 414,649

3 Claims. (Cl. 18—55)

This invention relates to a method of treating the normally crystalline polymers and co-polymers of vinylidene chloride, and particularly to a process of hardening articles prepared from such polymeric materials.

As herein used, the term "normally crystalline vinylidene chloride polymer" includes the polymer of vinylidene chloride alone, its co-polymers, and interpolymers which exhibit crystallinity when examined by X-ray diffraction methods or between crossed Nicol prisms and compositions prepared therefrom, by the inclusion of modifying agents, which compositions retain the working characteristics of the crystalline polymers. "Supercooled" vinylidene chloride polymer as herein used means normally crystalline vinylidene chloride polymer which has been substantially completely fused by heating it to a temperature above its crystalline melting point and then cooled or chilled in such manner as to bring it to a temperature below the crystalline melting point without substantial recrystallization.

The present invention is concerned with normally crystalline vinylidene chloride polymers which have been supercooled by chilling the fused materials to a temperature below about 50° C., and preferably to a temperature between about 10° C., and about 30° C., at a rate sufficiently rapid to prevent substantial recrystallization.

In United States Letters Patent 2,183,602 it is disclosed that polymeric vinylidene chloride and co-polymers thereof which contain vinylidene chloride as the major component, can advantageously be cold-worked without the application of high pressures by heating a body of the polymer or co-polymer to a temperature somewhat above the softening point thereof, followed by rapid chilling and subsequent plastic deformation. The present invention is concerned with an improvement in said patented procedure.

It has been found that molded articles produced according to the patented process may change dimensions, or flow, unless left in the mold for a prolonged period of time. This is a disadvantage, as, for example, in the production of large numbers of small molded articles by compression molding or similar procedure. It has, further, been found that all of the advantages inuring to the patented procedure can be had, and the disadvantage of temporarily impermanent shape occurring in some types of deformation overcome, by subjecting the object or article formed by plastic deformation or shaping of the supercooled polymer to a treatment whereby it is heated to a temperature between about 55° C. and 115° C., to effect substantial recrystallization of the polymer.

The most rapid rate of recrystallization occurs when the normally crystalline vinylidene chloride polymers are heated at temperatures between about 75° C. and about 95° C. At these latter temperatures, heating the polymeric materials for periods of time as short as 10 seconds is sufficient to cause observable recrystallization. When the polymeric materials are heated at the limiting temperatures of 55° C. and 115° C., the time ordinarily required to effect a like degrees of recrystallization is about 30 seconds. There is, then, an optimum temperature range in which normally crystalline vinylidene chloride polymers may be heated to effect recrystallization in a comparatively short time. In general, substantial recrystallization of the polymeric materials is effected by heating them to a temperature between about 55° C. and about 115° C. for periods of time of from about 30 seconds to about one hour.

While the normally crystalline vinylidene chloride polymers may be heated for longer periods of time than those specified above, there is usually no particular advantage obtained by prolonged heating. The normally crystalline vinylidene chloride polymers which have been fused, supercooled, and plastically deformed, recrystallize at a relatively fast rate when heated to temperatures between 55° C. and 115° C., and attain, in a comparatively short time, a degree of recrystallization such that prolonged heating does not produce any substantial increase thereof. The degree of hardness obtained by effecting recrystallization of the normally crystalline vinylidene chloride polymers will vary depending upon the particular polymer or co-polymer used and the amount of modifying agents included therein.

The crystallization may be effected by immersing the formed articles in a liquid bath for a sufficient period of time to heat them to temperatures in the aforementioned range, or the articles may be treated in a zone heated by radiation or by a current of hot gas.

As an illustration of the present invention, a one-eighth inch thick sheet of a crystalline polymer composed of 90 per cent vinylidene chloride with 10 per cent vinyl chloride and containing 7 per cent of plasticizer and having a crystalline melting point of 165° C., was fused at 180° C. by immersion for 90 seconds in a glycerin bath and then chilled by plunging the sheet into ice water. The supercooled sheet thus obtained was cut into strips which were molded at room temperature into spoon-shaped test specimens. Some of the specimens were transferred from the mold into a glycerin bath maintained at a temperature of 100° C. The specimens removed from the bath at the end of three minutes had a hardness of 103—15y—61, Rockwell. Specimens held in the mold at room temperatures for three minutes had a hardness of only 88—15y—45, and specimens held in the mold at room temperature for two hours had only attained a hardness of 88—15y—48.

This invention has been illustrated with respect to a particular composition containing a co-polymer of vinylidene chloride and vinyl chloride. It is to be understood that other proportions of these same co-polymerized ingredients may be used so long as the polymer conforms to the previously stated definition of crystalline polymers and that co-polymers other than the one of the example may be employed. Thus, the invention may be carried out in a similar manner and with like results while operating on the co-polymers of vinylidene chloride or other vinylidene halides and such co-polymerizable, unsaturated compounds as vinyl acetate, styrene, vinyl cyanide, methyl methacrylate, di-allyl oxalate, chloro-allyl-chloro-acetate and the like, so long as the proportion of vinylidene halide and co-polymer compound is such as to conform to the definition of crystalline polymers. The incorporation of minor amounts of plasticizers, coloring agents, fillers, heat-stabilizing agents and the like has also been found to be useful and desirable when used in such amounts that the crystallinity of the polymer is not affected.

This application is a continuation-in-part of application Serial No. 368,907, filed December 6, 1940.

I claim:

1. A method of processing a normally crystalline vinylidene polymer which comprises: fusing the polymer by heating it to a temperature above its crystalline melting point, cooling the fused polymer to a temperature below about 50° C., at a rate sufficiently rapid to avoid any substantial recrystallization, plastically deforming the supercooled polymer and heating it at temperature between about 55° C. and about 115° C.

2. A method of processing a normally crystalline vinylidene halide polymer which comprises: fusing the polymer by heating it to a temperature above its crystalline melting point, cooling the fused polymer to a temperature between about 10° C. and about 30° C., at a rate such that observable recrystallization is avoided, plastically deforming the supercooled polymer, and heating the shaped article to a temperature between about 75° C. and about 95° C.

3. In a method of processing a normally crystalline vinylidene chloride polymer which has been fused, supercooled and plastically deformed into a predetermined shape, the step which comprises: heating the shaped article to a temperature between about 75° C. and about 95° C. for at least 10 seconds.

RALPH M. WILEY.